(12) United States Patent
Stamey

(10) Patent No.: US 12,036,854 B1
(45) Date of Patent: Jul. 16, 2024

(54) NOISE AND HEAT REDUCTION HEADLINER SYSTEM FOR VEHICLES WITH SOFT CONVERTIBLE TOP

(71) Applicant: Joshua Ryan Stamey, Louisville, TN (US)

(72) Inventor: Joshua Ryan Stamey, Louisville, TN (US)

( * ) Notice: Subject to any disclaimer, the term of this patent is extended or adjusted under 35 U.S.C. 154(b) by 326 days.

(21) Appl. No.: 17/657,062

(22) Filed: Mar. 29, 2022

Related U.S. Application Data

(60) Provisional application No. 63/167,372, filed on Mar. 29, 2021.

(51) Int. Cl.
| | |
|---|---|
| *B60J 7/16* | (2006.01) |
| *B32B 3/04* | (2006.01) |
| *B32B 3/06* | (2006.01) |
| *B32B 5/18* | (2006.01) |
| *B60J 7/19* | (2006.01) |
| *B60R 13/01* | (2006.01) |
| *B60R 13/02* | (2006.01) |
| *B60R 13/08* | (2006.01) |
| *B32B 5/02* | (2006.01) |
| *B32B 5/24* | (2006.01) |
| *B32B 15/00* | (2006.01) |

(Continued)

(52) U.S. Cl.
CPC .............. *B60J 7/1664* (2013.01); *B32B 3/04* (2013.01); *B32B 3/06* (2013.01); *B32B 5/18* (2013.01); *B60R 13/0815* (2013.01); *B32B 5/02* (2013.01); *B32B 5/245* (2013.01); *B32B 15/00* (2013.01); *B32B 21/02* (2013.01); *B32B 25/10* (2013.01); *B32B 27/12* (2013.01); *B32B 2307/102* (2013.01); *B32B 2307/304* (2013.01); *B32B 2605/08* (2013.01); *B60J 7/194* (2013.01); *B60R 13/01* (2013.01); *B60R 13/0225* (2013.01)

(58) Field of Classification Search
CPC ..... B60R 13/01; B60R 13/02; B60R 13/0212; B60R 13/0225; B60R 13/0231; B60R 13/08; B60R 13/0815; B60J 7/0007; B60J 7/1664; B60J 7/194; B60J 7/11; B32B 5/245; B32B 5/18; B32B 5/02; B32B 5/00; B32B 21/02; B32B 25/10; B32B 27/12; B32B 2307/102; B32B 2307/304; B32B 2605/08; B32B 3/04; B32B 3/06
USPC .......................................................... 296/211
See application file for complete search history.

(56) References Cited

U.S. PATENT DOCUMENTS

| | | | | |
|---|---|---|---|---|
| 4,451,514 | A | * | 5/1984 | Hunt ....................... B60R 13/08 296/211 |
| 5,297,838 | A | * | 3/1994 | Cziptschirsch ..... B60R 13/0231 296/214 |

(Continued)

*Primary Examiner* — Gregory A Blankenship
(74) *Attorney, Agent, or Firm* — Robinson IP Law, PLLC

(57) ABSTRACT

A sound and heat insulator installable on a soft top vehicle includes: a body shaped to fit between a windshield frame and a roll bar of the soft top vehicle, the body having a rigid core, a foam layer located on each of an upper surface and lower surface of the rigid core, and an edging material located over the rigid core and the foam layer and around an edge of the body; one or more first mounting tabs located towards a front of the body; and one or more second mounting tabs located towards a rear of the body. At least one of the one or more first mounting tabs and the one or more second mounting tabs is shaped to engage a hard top mounting point of the soft top vehicle.

8 Claims, 4 Drawing Sheets

(51) Int. Cl.
*B32B 21/02* (2006.01)
*B32B 25/10* (2006.01)
*B32B 27/12* (2006.01)

(56) References Cited

U.S. PATENT DOCUMENTS

| | | | | |
|---|---|---|---|---|
| 5,513,891 | A * | 5/1996 | Horiuchi | B60J 7/11 180/69.21 |
| 5,984,405 | A * | 11/1999 | Ciacci | B60J 7/11 160/354 |
| 6,189,962 | B1 * | 2/2001 | Henderson | B60J 7/11 296/218 |
| 8,991,896 | B1 * | 3/2015 | Whitehead | B60J 7/196 296/121 |
| 11,938,799 | B1 * | 3/2024 | Steig | B60J 7/11 |
| 2003/0124940 | A1 * | 7/2003 | Michael | B29C 43/006 442/415 |
| 2005/0001446 | A1 * | 1/2005 | Morley | B60J 7/106 296/102 |
| 2005/0134096 | A1 * | 6/2005 | Fallis, III | B60J 7/1291 296/218 |
| 2014/0368001 | A1 * | 12/2014 | Jeakle | B60J 10/90 296/218 |
| 2018/0257467 | A1 * | 9/2018 | Rodriguez | B60J 1/085 |
| 2019/0256012 | A1 * | 8/2019 | Ozyegit | B60J 7/1291 |
| 2019/0263234 | A1 * | 8/2019 | Wheeland | B60J 7/1664 |
| 2020/0262280 | A1 * | 8/2020 | Stickles | B60J 7/1851 |
| 2022/0063384 | A1 * | 3/2022 | Durham | B32B 27/40 |
| 2023/0137099 | A1 * | 5/2023 | Durham | B60J 7/11 296/218 |
| 2023/0146506 | A1 * | 5/2023 | Gozzi | B32B 15/18 296/210 |
| 2024/0042731 | A1 * | 2/2024 | Servati | B32B 5/245 |

* cited by examiner

NOISE AND HEAT REDUCTION HEADLINER SYSTEM FOR VEHICLES WITH SOFT CONVERTIBLE TOP

CROSS-REFERENCE TO RELATED APPLICATION

This application claims priority to and is a non-provisional of U.S. Patent Application Ser. No. 63/167,372 for a "Noise and Heat Reduction Headline System for Jeep Wrangler™ Vehicles With Soft Convertible Top" filed on Mar. 29, 2021, the contents of which are incorporated herein by reference in its entirety.

FIELD

The present disclosure relates to novel noise and heat reduction systems used in vehicles with soft canvas convertible tops. More particularly, the present disclosure relates to an easily installed and removable system inside the occupant area in the above soft canvas convertible top. The system is designed to reduce noise caused by wind, the road and drivetrain while driving and to provide thermal insulation for additional comfort.

BACKGROUND

Vehicles with canvas convertible tops may be very noisy while driving. Due to the shape of vehicles having canvas convertible tops, such as Jeep Wrangler™ vehicles, wind noise can be extreme resulting in sustained elevated noise levels. According to the Centers for Disease Control, sustained noise levels above 70 db can cause fatigue while driving and make hands free calling difficult. Sustained noise levels above 80 db can cause permanent hearing loss after two hours of exposure.

Black canvas convertible tops can reach temperatures over 130 degrees Fahrenheit when in direct summer sun causing discomfort to vehicle occupants and making it difficult for air conditioning systems to effectively cool the occupant space.

What is needed, therefore, is a novel sound level and heat reduction system to allow for more comfortable driving conditions inside the occupant space of canvas convertible top vehicles.

SUMMARY

Embodiments described herein include a novel multi-layer system that insulates the vehicle occupants from excess noise and heat. A leading edge of the system uses two tabs to interface with the vehicles existing convertible top latching mechanism. A trailing edge of the system uses two preinstalled mounting brackets. These brackets are fixed to the existing vehicle roll protection bar with hardware that utilizes mounting points used when a hard top is installed.

In one aspect, a sound and heat insulator installable on a soft top vehicle includes: a body shaped to fit between a windshield frame and a roll bar of the soft top vehicle, the body having a rigid core, a foam layer located on each of an upper surface and lower surface of the rigid core, and an edging material located over the rigid core and the foam layer and around an edge of the body; one or more first mounting tabs located towards a front of the body; and one or more second mounting tabs located towards a rear of the body. At least one of the one or more first mounting tabs and the one or more second mounting tabs is shaped to engage a hard top mounting point of the soft top vehicle.

The one or more second mounting tabs may be shaped to engage the hard top mounting point located at a roll bar of the soft top vehicle. The one or more first mounting tabs may be shaped to engage a soft top mechanism towards a front of the soft top vehicle. The edging material may be formed of one of a rubber or polymer material.

The second mounting tabs may include a pair of elongate members, the pair of elongate members each having a first threaded aperture located proximate the body and a second threaded aperture located distal from the body, the first threaded aperture and second threaded aperture shaped to receive a threaded fastener therein. The threaded fastener may include a knob located on an end thereof.

In another aspect, a sound and heat insulator installable on a soft top vehicle includes: a body shaped to fit between a windshield frame and a roll bar of the soft top vehicle, the body having a rigid core, a foam layer located on each of an upper surface and lower surface of the rigid core, and an edging material located over the rigid core and the foam layer and around an edge of the body; one or more first mounting tabs located towards a front of the body shaped to engage a soft top mechanism towards a front of the soft top vehicle; and one or more second mounting tabs located towards a rear of the body shaped to engage a hard top mounting point at a roll bar of the soft top vehicle.

In yet another aspect, a sound and heat insulator installable on a soft top vehicle includes: a body shaped to fit between a windshield frame and a roll bar of the soft top vehicle, the body having a rigid core, a foam layer located on each of an upper surface and lower surface of the rigid core, and an edging material located over the rigid core and the foam layer and around an edge of the body; one or more first mounting tabs located towards a front of the body shaped to engage a soft top mechanism towards a front of the soft top vehicle; and one or more second mounting tabs located towards a rear of the body shaped to engage a hard top mounting point at a roll bar of the soft top vehicle, each of the one or more second mounting tabs comprising a pair of elongate members, the pair of elongate members each having a first threaded aperture located proximate the body and a second threaded aperture located distal from the body, the first threaded aperture and second threaded aperture shaped to receive a threaded fastener therein.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Novel sound and heat reduction systems, devices, apparatuses, and methods for reducing wind, drive train and road noise along with heat reduction from the thermal conductivity of sun light are discussed herein. In the following description, for the purposes of explanation, numerous specific details are set forth in order to provide a thorough understanding of the present invention. It will be evident, however, to one skilled in the art that embodiments of the present disclosure may be practiced without these specific details.

Figure 1:
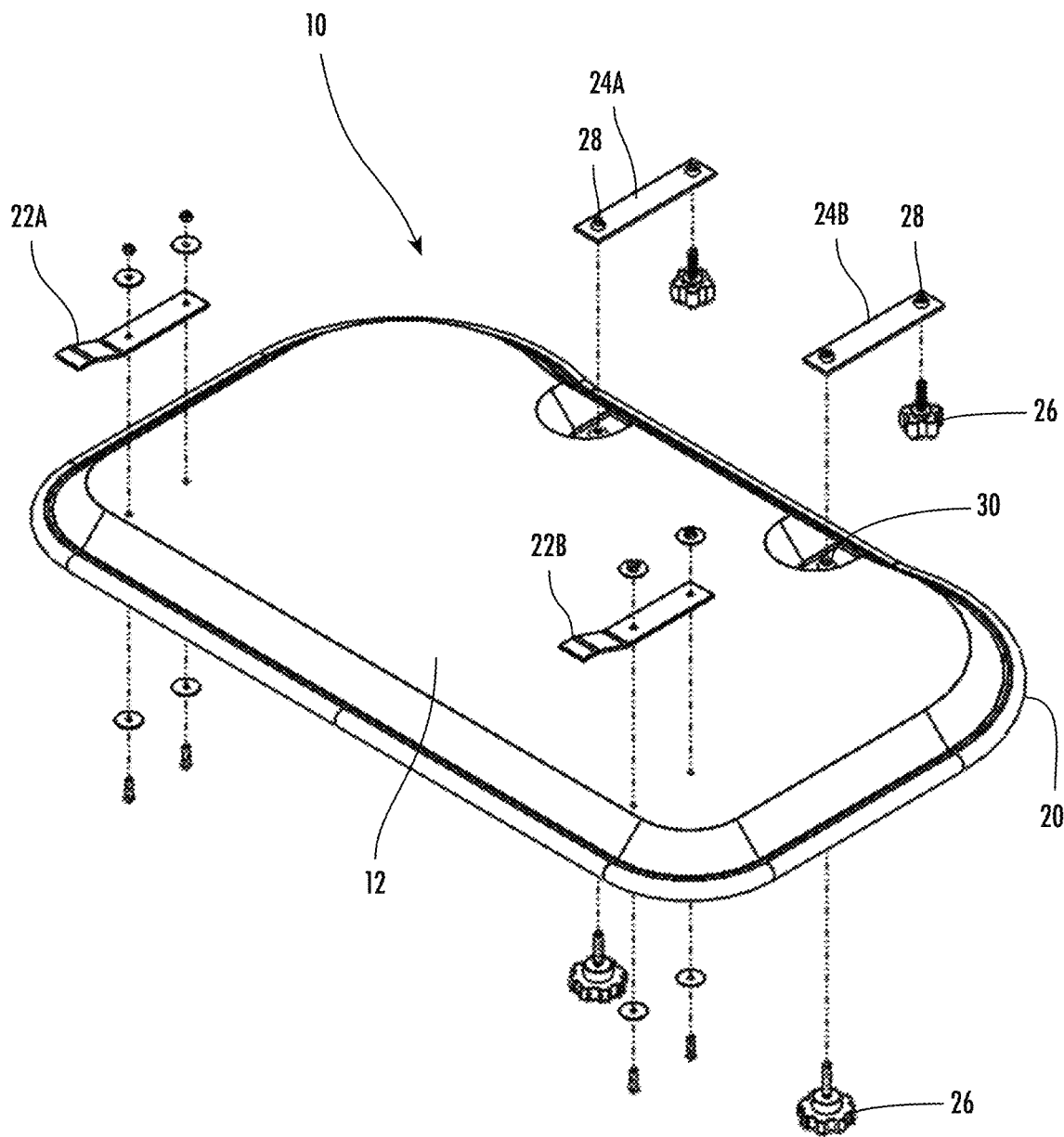
FIG. 1 depicts an exploded perspective view of one example of a sound and heat insulating system and associated mounting hardware.

Embodiments of the present disclosure will now be described by referencing the appended figures representing preferred embodiments. The figures depict the invention as applied to the front seat area of a two door off-road vehicle having a removable or soft top, such as a Jeep Wrangler™ vehicle. However, embodiments described herein can be applied to the front and rear seating areas of all Jeep Wrangler™ vehicles as well as other soft canvas convertible vehicles and may be suitable for other like vehicles. FIG. 1 depicts an exploded perspective view of elements that may be included on a noise and heat reduction system 10 and possible hardware configuration. Bracket hardware can be used in conjunction with vehicle's manufacturer tabs, latches, brackets, holes, and structure. Mounting hardware can be threaded bolts and/or screws, rivet nuts, nuts and/or washers, quick release pins or various other hardware configurations.

Figure 4:
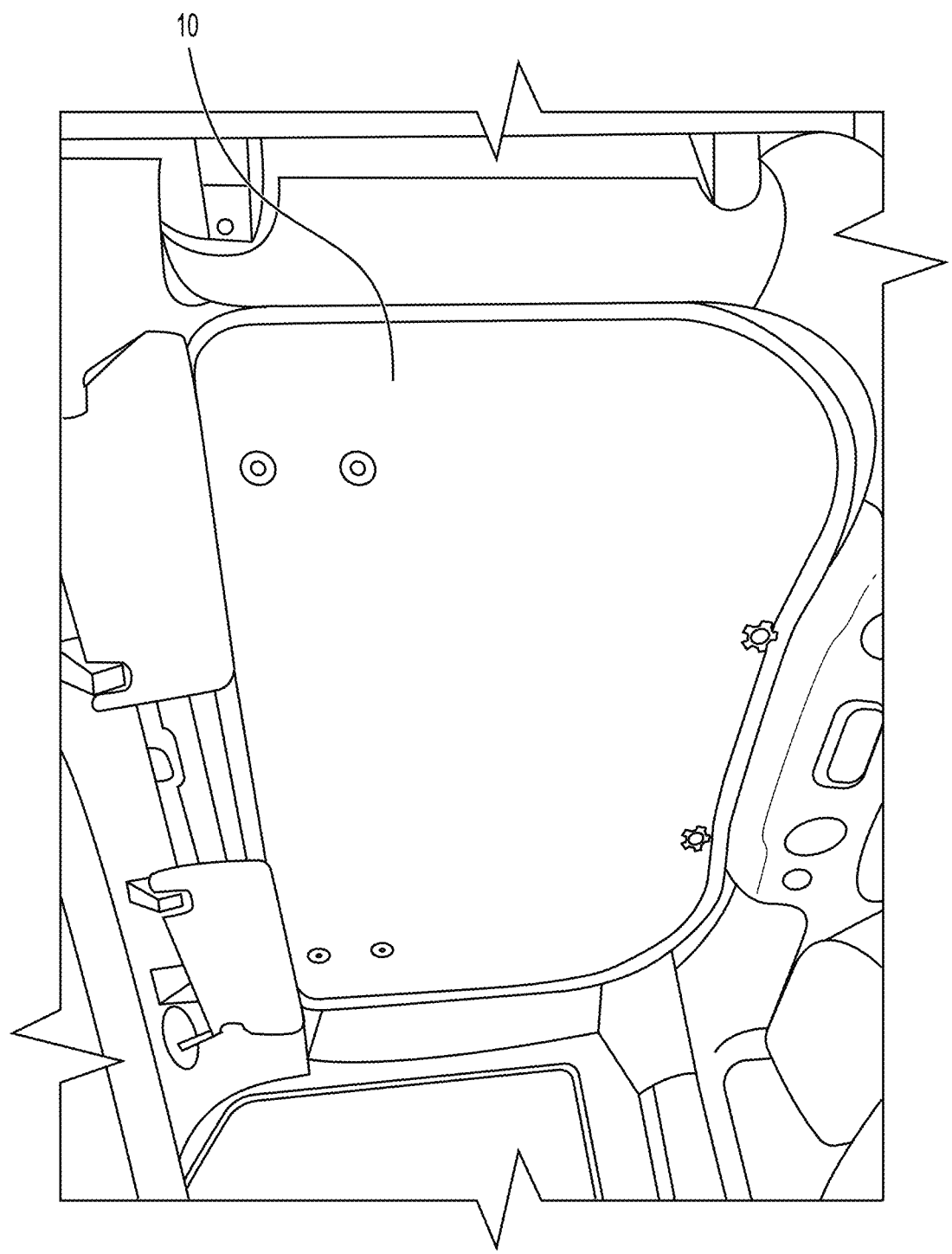
FIG. 4 is a photograph of one example of the sound and heat insulating system from the vehicle occupant area.

The noise and heat reduction system 10 may include a body portion 12. The body portion may be shaped to fit between a windshield frame and a roll bar of a soft top vehicle, as shown in FIG. 4. A bottom layer 14 (FIG. 2) may be fabric backed foam. A center layer 16 may be a structural layer and may be formed of solid wood, plywood, rigid plastic, metal, laminated composite, or other dimensionally correct rigid materials. A top layer 18 may also be foam with a fabric backing. Various types of foam and fabric can be used to improve performance or physical characteristics. One or more edges are protected by a rubber or polymer trim 20.

Figure 2:
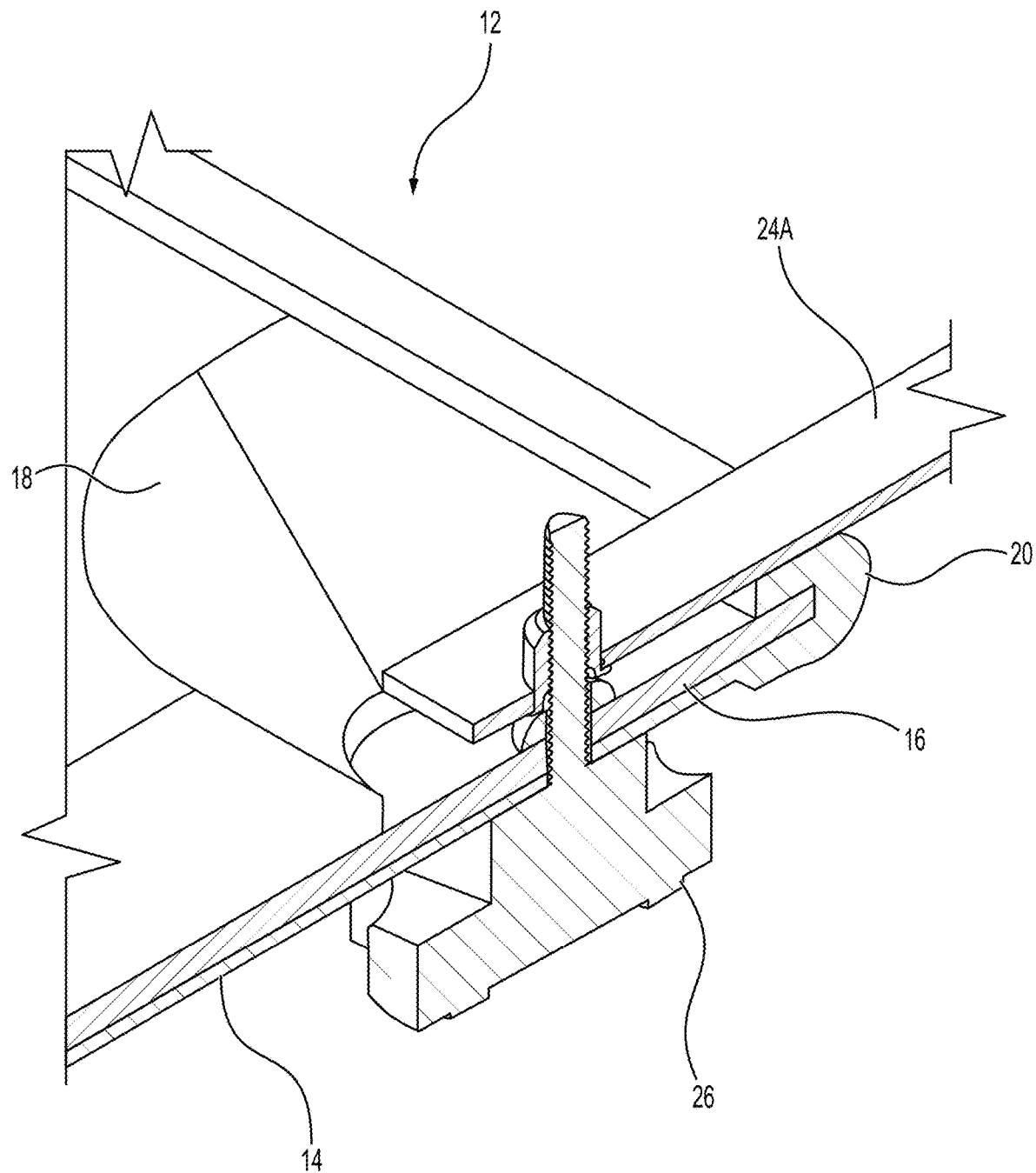
FIG. 2 depicts a cross section view of one example of a sound and heat insulating system along with the rear mounting bracket and hardware.
Figure 3:
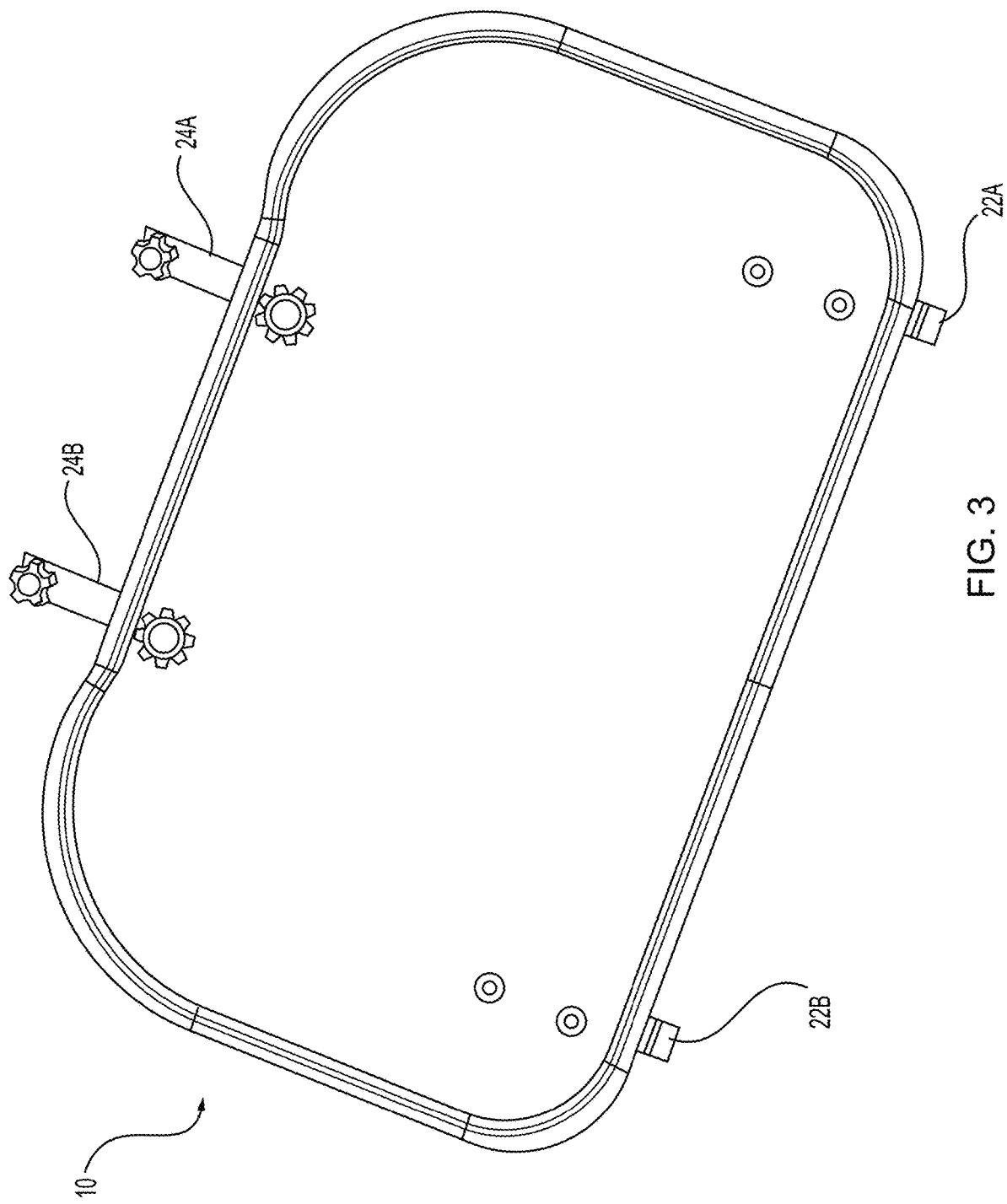
FIG. 3 depicts the view of one example of the sound and heat insulating system from the vehicle occupant area.

In preferred embodiments, a leading edge of the system uses two tabs 22A and 22B to interface with the vehicles existing convertible top latching mechanism. A trailing edge of the system uses two preinstalled mounting brackets 24A and 24B. The mounting brackets 24A and 24B fixed to an existing vehicle roll protection bar with hardware that utilizes mounting points used when a hard top is installed, as shown in FIGS. 3 and 4. One or more fasteners 26 may be used to secure the mounting brackets 24A and 24B to the vehicle and to secure the noise and heat reduction system 10 to the mounting brackets 24A and 24B. For example, as shown in FIG. 1, each of the mounting brackets 24A and 24B may include threaded apertures 28 located on opposing ends of the mounting brackets 24A and 24B. The one or more fasteners 26 may threadably engage the apertures 28 of the mounting brackets 24A and 24B, as shown in FIG. 2. The one or more fasteners 26 may be inserted through one or more apertures 30 formed through the body 12.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A sound and heat insulator installable on a soft top vehicle comprising:
    a body shaped to fit between a windshield frame and a roll bar of the soft top vehicle, the body having
        a rigid core,
        a foam layer located on each of an upper surface and lower surface of the rigid core, and
        an edging material located over the rigid core and the foam layer and around an edge of the body;
    one or more first mounting tabs located towards a front of the body; and
    one or more second mounting tabs located towards a rear of the body;
    wherein at least one of the one or more first mounting tabs and the one or more second mounting tabs is shaped to engage a hard top mounting point of the soft top vehicle.

2. The sound and heat insulator of claim 1, wherein the one or more second mounting tabs are shaped to engage the hard top mounting point located at a roll bar of the soft top vehicle.

3. The sound and heat insulator of claim 1, wherein the one or more first mounting tabs are shaped to engage a soft top mechanism towards a front of the soft top vehicle.

4. The sound and heat insulator of claim 1, wherein the edging material is formed of one of a rubber or polymer material.

5. The sound and heat insulator of claim 1, the second mounting tabs comprising a pair of elongate members, the pair of elongate members each having a first threaded aperture located proximate the body and a second threaded aperture located distal from the body, the first threaded aperture and second threaded aperture shaped to receive a threaded fastener therein.

6. The sound and heat insulator of claim 1, wherein the threaded fastener includes a knob located on an end thereof.

7. A sound and heat insulator installable on a soft top vehicle comprising:
    a body shaped to fit between a windshield frame and a roll bar of the soft top vehicle, the body having
        a rigid core,
        a foam layer located on each of an upper surface and lower surface of the rigid core, and
        an edging material located over the rigid core and the foam layer and around an edge of the body;
    one or more first mounting tabs located towards a front of the body shaped to engage a soft top mechanism towards a front of the soft top vehicle; and
    one or more second mounting tabs located towards a rear of the body shaped to engage a hard top mounting point at the roll bar of the soft top vehicle.

8. A sound and heat insulator installable on a soft top vehicle comprising:

a body shaped to fit between a windshield frame and a roll bar of the soft top vehicle, the body having
  a rigid core,
  a foam layer located on each of an upper surface and lower surface of the rigid core, and
  an edging material located over the rigid core and the foam layer and around an edge of the body;
one or more first mounting tabs located towards a front of the body shaped to engage a soft top mechanism towards a front of the soft top vehicle; and
one or more second mounting tabs located towards a rear of the body shaped to engage a hard top mounting point at the roll bar of the soft top vehicle, each of the one or more second mounting tabs comprising a pair of elongate members, the pair of elongate members each having a first threaded aperture located proximate the body and a second threaded aperture located distal from the body, the first threaded aperture and second threaded aperture shaped to receive a threaded fastener therein.

* * * * *